Feb. 19, 1963  E. H. VICKERY  3,077,895
BALL VALVE
Filed May 12, 1961
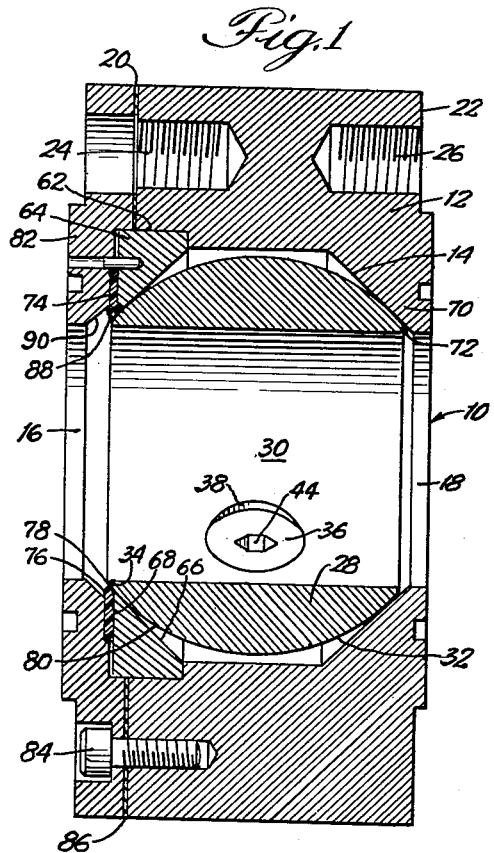
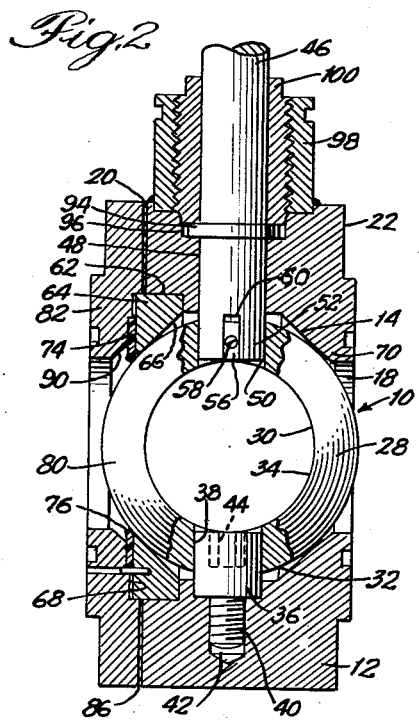
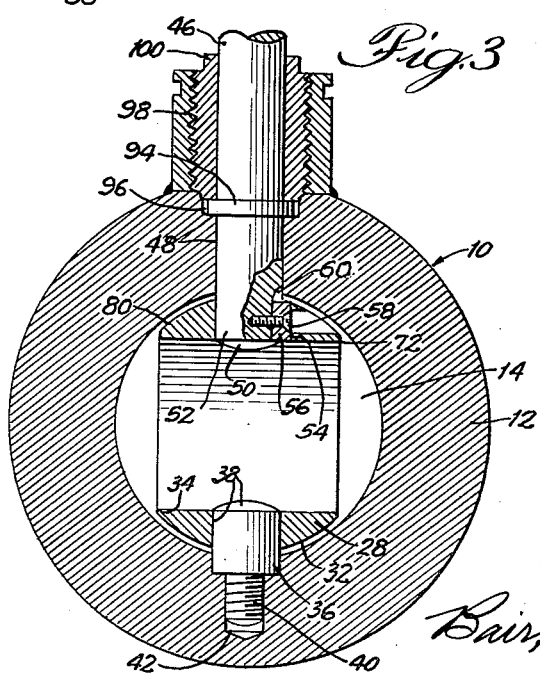
INVENTOR:
Edgar Herbert Vickery,
BY
Bair, Freeman & Molinare
ATTORNEYS.

United States Patent Office 3,077,895
Patented Feb. 19, 1963

3,077,895
BALL VALVE
Edgar Herbert Vickery, Oakland, Calif., assignor to Fisher Governor Company, a corporation of Iowa
Filed May 12, 1961, Ser. No. 109,672
3 Claims. (Cl. 137—315)

This invention relates to a ball valve for use in fluid flow lines, and in particular, to a valve adapted for use under extreme conditions of temperature and pressure.

This application is a continuation in part of patent application Serial No. 677,617, filed August 12, 1957.

Recent technical developments in rocket and missile devices have made imperative the furnishing of control valves for various fluid materials which are operable under extreme conditions. In particular, valves are required for controlling and shutting off the supply of cryogenic fluids such as liquid oxygen, which is handled at a very low temperature and a very high pressure. The valve must be drop tight when closed yet afford full flow when open, and it must be very reliable in its operation. The valve construction must be rugged, and it must be readily opened and closed under the strenuous conditions.

It is therefore an object of the invention to provide a ball valve which satisfies the foregoing requirements, and especially, which provides a drop tight closure while being readily operated and reliable in its operation.

Another object is to provide a ball valve which is rugged and which can be manufactured, assembled and disassembled readily and economically.

A particularly object is to provide a ball valve having a new and improved mounting for the valve ball.

These and other objects, advantages and functions of the invention will be apparent on reference to the specification and to the attached drawings, illustrating a preferred embodiment of the invention, in which like parts are identified by like reference symbols in each of the views, and in which:

FIGURE 1 is a longitudinal cross-sectional view of the ball valve, taken along the axis of flow, illustrating the valve ball in open position;

FIGURE 2 is a vertical longitudinal cross-sectional view of the ball valve, on a somewhat reduced scale, with parts in elevation and with the valve ball in closed position, taken along the axis of flow and at an angle with respect to the plane of the section of FIGURE 1; and FIGURE 3 is a transverse-sectional view of the ball valve with parts in elevation, taken on the axis of rotation of the valve ball and at right angles to the plane of the section of FIGURE 2.

The particular problem with which this invention is concerned is to provide a valve which remains reliably drop tight and which also can be turned under extreme conditions. Valves as described in the present invention are drop tight under liquid oxygen at 1,000 lbs. per sq. in. pressure, under liquid nitrogen at 1,200 lbs. per sq. in., and under helium gas at 2,100 lbs. per sq. in. and minus 300° F. These results are accomplished by the particular design of the valve. It will be apparent that the invention also finds other important applications.

Referring to the drawings, a preferred embodiment of the ball valve is generally indicated at 10, and except for sealing members, it preferably is constructed of metal parts. The valve proper includes a metallic housing 12 having a valve cavity 14 therein establishing communication between axially aligned openings defining a flow passage, in particular, an inlet opening 16 and an outlet opening 18. The body is partly defined by a pair of transverse parallel faces 20 and 22 adjacent the inlet and outlet openings, respectively. The respective faces are provided with threaded recesses 24 and 26 for the reception of appropriate fastening devices (not shown) for securing the valve in a pipeline or comparable conduit.

A highly polished metallic valve ball, sphere, or rotor 28 is disposed within the valve cavity 14. The valve ball includes a central cylindrical flow passage or opening 30 therethrough of approximately the same diameter as the inlet and outlet openings 16 and 18, and adapted to register or align therewith in the open position of the valve. The valve is closed by rotating the valve ball 90 degrees, as illustrated in FIGURES 2 and 3. The valve ball has an outer surface 32 which is as nearly as possible spherical, with a slight radius 34 at the intersection of the surface with the flow passage 30, to avoid sharp edges.

The valve ball 28 is designed for rotation about an axis at right angles to the axis of the openings 16 and 18. This rotation is in part effected by a journal plug 36 inserted in a plug opening 38 in the base of the valve ball, the plug serving as a bearing for the surface of the plug opening. The journal plug has a threaded extension or shank 40 extending outwardly from the cylindrical bearing head 41. A threaded recess 42 is formed in the chamber wall 43 in the base of the valve housing 12. The journal plug shank 40 is secured in the recess in threaded engagement with the housing, and the valve ball is rotated on the plug head 41 which provides a bearing surface.

The length and the diameter of the journal plug 36 and the remaining construction are such that the plug can be introduced into its proper position through the inlet opening 16, for example, into the valve ball flow passage 30. The plug then can be dropped in an axial direction through the plug opening 38 and threaded into the wall recess 42, for engagement with the housing. To assist in engaging and tightening the journal plug, suitable wrench receiving surfaces 44 are provided in the head 41 thereof. The construction is adapted for inserting a tool through one of the housing openings and through the ball flow passage 30, to engage the wrench receiving surfaces on the plug.

A valve stem 46 is secured to the valve ball 28 for rotation therewith, at the top of the valve ball and opposite to the journal plug 36 in axial alignment therewith. A corresponding cylindrical vertical opening 48 is provided in the valve housing 12, which provides a journal surface for the valve stem for rotation therein. The valve stem extends into valve chamber 14 and into a corresponding cylindrical radial stem opening or bore 50 at the top of the valve ball, so that the inner end 52 of the stem serves as a journal support for the valve ball. The wall recess 42, the valve ball plug opening 38, the valve ball stem opening 50, and the housing stem opening 48 all register with each other in axial alignment along and concentric with the axis of the valve stem 46. The valve stem axis also coincides with a diameter of the valve ball 28. The valve ball thus is accurately located for turning and for bearing on the valve stem 46 and journal plug 36.

The inner end of the valve stem 46 is provided with a longitudinal slot 54 in which a key 56 projecting outwardly therefrom is secured by a fastening 58. The key also seats in a corresponding keyway or groove 60 in the valve ball 28. The interconnection between the valve stem and the valve ball is such that the valve can move slightly in the direction of the axis of the rotation, while it rotates together with the valve stem. The valve ball is thus free to "float" slightly along the rotational axis, and this slight degree of freedom is important in precluding any binding of the valve ball and providing accurate location of the valve ball relative to the sealing means.

In order to provide the tight seal which is required, the surfaces defining the valve cavity 14 are especially contoured. The valve cavity is enlarged, preferably adjacent the inlet opening 16, to provide an annular recess or groove 62, which receives a removable circular backing ring 64. When the backing ring is seated within the annular recess 62, its inner frusto-conical surface 66 is substantially tangent to the spherical surface 32 of the valve ball except for a slight or minimum running clearance between the surfaces. This is so small as not to be illustrated to scale in the drawing, and in practice should be small enough to provide support for the sealing ring and prevent extrusion between the ball and backing ring. The upstream face 68 of the backing ring lies in a transverse plane perpendicular to the axis of flow through the ball valve, which plane intersects the valve ball 28 between its axis of rotation and the intersection of the flow passage 30 with the ball surface 32 adjacent the inlet opening. The ring face surface is adjacent to but spaced a small distance downstream from the flow passage intersection. The frusto-conical surface 66 continues beyond the point of approximate tangency toward the flow passage intersection, so that the backing ring serves as a firm support for a ring seal 74.

A similar construction of a frusto-conical surface is provided by an inwardly extending section 70 adjacent the outlet opening 18. The clearance between the section 70 and the valve ball 28, indicated at 72, is in the preferred embodiment illustrated sufficient for communication of the outlet opening 18 with the downstream face of the ring seal supported by the backing ring 64.

The seal 74 is a thin stiff flexible flat ring having a surface of a deformable material, and it is secured in the housing 12 on the upstream face 68 of the backing ring around and adjacent the inlet opening 16. The seal is generally planar when standing freely before installation and is annular in plan. It has an inner circular cylindrical periphery 76 defining a central opening, the seal being shown, however, flexed as it is mounted in use. The inner peripheral surfaces define a downstream edge 78 bordering the seal opening which in use abuts the upstream face 80 of the valve ball in line contact therewith at the edge point, furnishing the desired sealing engagement with the valve ball. The ring seal inner periphery 76 and the edge 78 are highly polished, as is especially the upstream face 80 of the valve ball. Depending upon the material of construction, and in order to avoid crushing the ring seal 74, the edge 78 may be machined or bevelled very slightly, providing a narrow band contacting the ball face 80 therearound, the band being on the order of several thousandths of an inch up to, in some cases, about $\frac{1}{16}$ of an inch. Such a band may be formed, in any event, by wear occurring at the edge 78. Nevertheless, the seal preferably is substantially in line contact with the ball face at the edge 78. This and the subsequently described construction produces high unit loading at the contact line of the two smooth surfaces, which prevents fluid from being forced between the seal and the ball valve.

In providing a valve which is operable under the extreme conditions described, a hard, rigid yet flexible flat ring seal having a surface of deformable material is employed. The seal, or at least the surfaces including the inner downstream edge 78, preferably is constructed of hard and rigid, as distinguished from elastomeric, synthetic thermoplastic resin material, having sufficient flexibility for the construction and sufficient deformability for tightly conforming to the surface of the valve ball 28. Examples of preferred materials fulfilling these requirements are polychlorotrifluoroethylene (Kel-F and Fluorothene), polytetrafluoroethylene (Teflon), and nylon. Such materials are classified according to their mechanical behavior as plastics, not elastomers. The preferred material of construction is the polymer of chlorotrifluoroethylene. This material is especially adapted for liquid oxygen valves. At the temperatures encountered elastomers such as rubber harden and shatter. Nylon is not used in this application, as it will react violently with the oxygen and is not adapted for the low temperatures. However, it is excellent at higher temperatures and for nitrogen valves under 3,500 lbs. per sq. in. pressure, for example. The polymer of tetrafluoroethylene is subject to crushing and cold flow in liquid oxygen valves and therefore is not recommended; however, in other applications, it may be employed successfully. In the latter case, and in other cases where desirable, the polymer may be reinforced by fabric or metal inserts.

When the seal 74 is installed, it is clamped against the backing ring 64 by a closure plate 82 secured to the valve body 12 by fastenings 84. One or a plurality of very thin gaskets 86 may be interposed between the closure plate and the valve body, so that the degree of compression of the sealing ring 74 between the backing ring and the closure plate can be accurately established. The sealing ring is slightly compressed and held very firmly in position with sufficient tightness to preclude leaking along either face thereof.

The ring seal 74 when unconfined has an inner portion 88 extending freely from the clamped portion. When the seal is installed, the inner portion 88 flexes or bends in the upstream direction as it is pressed against the upstream face 80 of the valve ball 28. The backing ring 64 precludes any extrusion of the seal 74 into the space between the backing ring and the valve ball. The thickness and stiffness of the seal 74 are such that when installed, the inner portion 88 is deformed substantially into a conical shape with only the downstream edge 78 of the seal in contact with the valve ball 28.

When assembled, the downstream edge 78 of the seal exerts an initial bearing pressure on the valve ball face 80, in the absence of fluid pressure on the valve. When fluid pressure is exerted on the upstream face of the inner portion 88 of the seal, the pressure of the seal against the valve ball is increased to provide a very tight engagement. For this purpose, the closure plate 82 is provided with an inwardly widening frusto-conical surface 90 around the inlet opening 16, exposing the seal inner portion 88 to the upstream pressure. The downstream face of the seal inner portion 88 is in communication with the downstream valve opening 18 through the clearance 72, which is normally at lower pressure.

Other parts of the construction which are illustrated include a collar 94 on the valve stem, which is seated in a corresponding recess in the valve housing 12 and enclosed by a seal 96. A tubular neck portion 98 is provided on the valve housing around the valve stem, and it is internally threaded. A tubular nut 100 surrounds the valve stem and is in external threaded engagement with the neck 98, to hold the stem collar 94 in position. The valve stem 46 may be turned by appropriate manual or mechanical means, not shown.

It will be apparent that various changes and modifications may be made in the construction and arrangement of the parts within the spirit and scope of the invention. It is intended that such changes and modifications be included within the scope of the appended claims.

What I claim as new and desire to secure by Letters Patent of the United States is:

1. A ball valve comprising a valve housing, a wall defining a valve chamber in said housing, a valve ball in said chamber having a flow passage therethrough, means forming a stem opening in said valve housing, means forming a recess in said chamber wall in axial alignment with said stem opening, said recess being internally threaded, means forming a stem opening in said ball registering with said housing stem opening, a valve stem in said housing stem opening and extending into said ball stem opening, means connecting said stem to said ball for movement of the ball along the stem axis and for rotation of the ball and stem together about the stem axis, means forming a plug opening in said ball registering with said wall recess, and a journal plug having an externally threaded end portion insertable through said ball flow passage into said plug opening, and engageable with said housing in said internally threaded wall recess.

2. A ball valve comprising a valve housing having aligned inlet and outlet openings, a wall defining a valve chamber in said housing, a removable valve chamber closure defining one of said openings, a valve ball insertable into said chamber and secured therein by said closure, means defining a flow passage through said ball, said ball being adapted to be rotated for moving said flow passage into and out of alignment with said inlet and outlet openings for opening and closing the valve, means forming a stem opening in said valve housing at right angles to said aligned inlet and outlet openings, means forming a recess in said chamber wall in axial alignment with said stem opening, said recess being internally threaded, a valve stem in said stem opening connected to said ball for rotation therewith about the stem axis, means forming a plug opening in said ball registering with said wall recess and a journal plug having an externally threaded end portion insertable through said closure and said ball flow passage into said plug opening, and engageable with said housing in said internally threaded wall recess.

3. A ball valve comprising a valve housing, wall means defining a valve chamber in said housing, a valve ball in said chamber having a flow passage therethrough, means forming a stem opening in said valve housing, means forming a recess in said chamber wall in axial alignment with said stem opening, at least a portion of said recess being internally threaded, a valve stem in said stem opening connected to said ball for rotation therewith about the stem axis, means forming a plug opening extending through said ball and registering with said wall recess, a journal plug insertable through said ball flow passage into said plug opening, said journal plug having the end portion thereof externally threaded and engageable with said housing in said internally-threaded wall recess, a portion of said journal plug having substantially the same diameter as said plug opening and serving as a bearing for the valve ball, and the end portion of said journal plug having an external diameter no greater than that of said plug opening, and means in said first portion of said journal plug for receiving a tool through said ball flow passage to rotate said journal plug with respect to said housing to engage said journal plug with said housing.

References Cited in the file of this patent
UNITED STATES PATENTS

| | | |
|---|---|---|
| 1,784,381 | O'Stroske | Dec. 9, 1930 |
| 2,665,879 | Housekeeper | Jan. 12, 1954 |
| 2,800,295 | Thomas | July 23, 1957 |

FOREIGN PATENTS

| | | |
|---|---|---|
| 761,977 | Great Britain | Nov. 21, 1956 |